Patented Feb. 11, 1941

2,231,241

UNITED STATES PATENT OFFICE 2,231,241

AMPLIFIED DISTILLATION

James R. Bailey, Austin, Tex., assignor to Union Oil Company of California, Los Angeles, Calif., a corporation of California No Drawing. Original application April 8, 1935, Serial No. 15,289. Divided and this application May 25, 1937, Serial No. 144,683

5 Claims. (Cl. 202—41)

This invention relates to fractional distillation and particularly to the separation by fractional distillation of materials the components of which have narrow boiling point separation. The invention also relates to fractionation, isolation and the recovery of the components of nitrogen bases, naphthenic acids and the like fractions having narrow boiling point separation. This application is a division of my copending application Serial No. 15,289, filed April 8, 1935, Patent No. 2,085,287.

The resolution and recovery of organic substances such as nitrogen bases, naphthenic acids and the like by means of fractional distillation has heretofore presented numerous difficulties. In many cases when the distillation temperature has risen to a point where the substance desired will distill overhead, decomposition will occur. Moreover, many of these organic compounds occurring in the mixtures from which it is desired to separate them have boiling point temperature differences which are so small that successful separation by conventional methods of fractional distillation cannot be attained even where the most highly efficient fractionating apparatus is employed. Additionally, it is often the case that the quantities of the materials with which it is necessary to work and from which it is desired to make the hereinbefore mentioned separation is so small that the fractionation process is impractical even in the most refined equipment.

It is therefore an object of this invention to provide a process whereby a complex mixture of substances having a narrow boiling point range can be resolved into its components with facility. It is also an object of this invention to present a process whereby a substance having a narrow boiling point range can be sharply separated into a plurality of sharply defined components. It is another object of this invention to provide a process whereby extremely small quantities of substances can be successfully fractionated in standard stills. It is a further object of this invention to provide a process for fractionally distilling substances which are ordinarily susceptible to decomposition at temperatures near their boiling points without such decomposition or destruction.

These objects are attained by employing a process of amplified distillation wherein the primary material to be closely fractionated is first mixed with a suitable secondary extraneous liquid medium having a boiling point range greater than that of the material to be fractionated, wherein the mixture is subsequently fractionated into numerous narrow cuts each containing a narrow cut portion of the original added material to be fractionated and wherein the extraneous liquid medium is of such character that the said accompanying narrow cuts of material to be fractionated can be extracted therefrom by other means than distillation such as by chemicals or solvents.

The invention broadly stated comprises dissolving the narrow boiling range material to be closely fractionated in an extraneous liquid medium or carrier having greater volume and greater boiling point range than the said material to be fractionated, fractionally distilling the resulting dissolved mixture of augmented volume to produce a number of fractions of the mixture distributed over the boiling point range thereof and then separating the portion of the included original material to be fractionated from each of said fractions of the mixture by means other than distillation such as by chemicals or solvent extraction. The invention also resides in lowering the average effective boiling points of the components of the material to be fractionated sufficiently to substantially prevent cracking thereof, by the addition of an extraneous liquid medium. The invention further resides in spreading the boiling point range of normally narrow boiling point range material by the addition thereto of an extraneous liquid medium having a greater boiling point range than the said narrow boiling point range material. The invention also resides in fractionation in the presence of an extraneous liquid medium from which the desired fractions can be subsequently readily separated by other processes such as by chemicals or solvent extraction.

It has been discovered that complex mixtures of organic substances such as nitrogen bases, naphthenic acids, xylene isomers and the like the components of which have boiling points lying very close together can be successfully fractionated and separated into their components by carrying on the fractionation in the presence of an added extraneous liquid carrier comprising a mixture of substances or fractions having a relatively wide boiling point range. In other words the effective boiling point separations of narrowly separated boiling point components are increased when the distillation is carried on in the presence of the hereinbefore mentioned added extraneous liquid carrier medium having components in itself covering a relatively wide range of boiling points.

This method of distillation wherein a quantity of an extraneous mixture is added to the primary material to be distilled is also particularly advantageous when the primary substance to be fractionated is too small in quantity to be handled alone in any laboratory micro-still. The addition of the said extraneous mixture of substances in the proportion of 25 or 100 to 1 of the original material to be fractionated makes it possible to so augment the total volume of the mixture that fractionation is entirely practicable in standard laboratory equipment. When this method of distillation is employed it is also found that the original materials to be distilled are carried overhead at temperatures which are lower than their own natural boiling points. This eliminates in many cases the detrimental occurrence of cracking or decomposition which takes place with some substances before their natural boiling points are reached when distilled alone.

The invention can be best illustrated by the following example of amplified distillation:

To 1 c. c. mixture comprising two nitrogen bases, pyridine and 2-methyl pyridine having boiling points of 115.3° C. and 128.0° C. respectively, was added 25 c. c. of an extraneous hydrocarbon oil, a petroleum fraction having a boiling point ranging from 105 to 140° C. The resulting mixture was distilled through a standard laboratory micro-still and thirteen cuts taken. Each cut thus obtained was treated separately with 6 normal sulfuric acid and the acid extracted cut denaphthaed to remove the last traces of hydrocarbon oil. The cuts were next freed with caustic and then steam distilled. The resulting distillates which comprised the nitrogen bases in an aqueous solution were next treated with 100 c. c. of aqueous picric acid which resulted in the precipitation of the bases in each cut in the form of picrates, which were then distinguishable by their distinctly different crystal forms.

The resulting sharp separation of the bases and their relative distribution throughout the cuts are recorded in Table I.

*Table I*

| Cut No. | Volume c. c. base+H. C. | Boiling point, °C.—750 mm. Base+H. C. | H. C. base removed | Weight picrate from fraction (gm.) | Picrates as identified by crystal formations |
|---|---|---|---|---|---|
| 1 | 2.1 | 72– 94 | 90.1 | 0.5374 | Pyridine. |
| 2 | 1.4 | 94– 99 | 95.2 | 0.3864 | |
| 3 | 1.7 | 99–101 | 99.2 | 0.0212 | |
| 4 | 1.8 | 101–103 | 101.5 | 0.0389 | |
| 5 | 1.7 | 103–112 | 107.8 | 0.2398 | |
| 6 | 1.8 | 112–113 | 113.8 | 0.2844 | |
| 7 | 1.7 | 113–115 | 115.0 | 0.2670 | 2-methyl pyridine. |
| 8 | 1.8 | 115–118 | 117.8 | 0.0396 | |
| 9 | 1.7 | 118–122 | 121.5 | | |
| 10 | 1.8 | 122–123 | 123.2 | | |
| 11 | 1.7 | 123–125 | 125.5 | | |
| 12 | 1.8 | 125–133 | 130.5 | 0.0013 | |
| 13 | 1.7 | 133–135 | 134.5 | | |
| Residue | 3.1 | | 143.5 | | |

It was found that the picrates recovered from the first three fractions contained substantially all of the pyridine and no detectable quantity of 2-methyl pyridine, while the picrates recovered from the fractions numbers 4 to 12 contained substantially all of the 2-methyl pyridine with no detectable quantity of pyridine. The balance of the fractions 9 to 13 and including the residue contained in all only 0.0013 gm. of crystalline picrates, the bulk of the bases having been carried by the lighter fractions. This recovery of pyridine and 2-methyl pyridine in the combined form of picrates amounts to 50 and 54 per cent, respectively, and when their water solubilities are considered the total over-all recovery in this example is 74 per cent. From these results it is apparent that the process of this invention is capable of accomplishing a sharp separation of two substances having only slight separation of boiling point.

The boiling points of the recovered pyridine and 2-methyl pyridine were 115° C. and 128° C. respectively. It is to be noted in Table I that the bulk of the pyridine normally boiling at 115° C. was by the method of amplified distillation carried overhead at a temperature of approximately 90° C. and the bulk of the 2-methyl pyridine normally boiling at 128° C. was distilled overhead with the extraneous oil boiling at approximately 114° C. From this it is to be observed that the effective boiling points of the recovered fractions are lowered and separated. Where the difference in boiling points of the two bases alone was 13° C., in the presence of the extraneous carrier it was 24° C. Thus, it is apparent that it is possible to lower and to spread apart the apparent boiling points of mixtures of substances to be fractionated by admixing a suitable carrier and thus achieving a more complete separation than is possible with direct distillation.

Another example of amplified distillation carried on according to this invention is given as follows:

127 c. c. of nitrogen bases produced from a kerosene fraction of petroleum by sulfuric acid extraction and having a boiling point of 267.0° C. and a refractive index of 1.5082 was fractionally distilled in the presence of 500 c. c. of a gas oil hydrocarbon fraction having a boiling point range from 250° C. to 270° C. A tabulation of the results of this distillation is found in Table II.

*Table II*

| Cut No. | Volume—c. c. Cut | Volume—c. c. Oil | Volume—c. c. Base | Boiling point Oil | Boiling point Base | Refractive index | Density 20/20 |
|---|---|---|---|---|---|---|---|
| 1 | 51 | 46 | 5 | 248 | 263 | 1.5060 | .935 |
| 2 | 54 | 49 | 5 | 251 | 264 | 1.5060 | .930 |
| 3 | 52 | 46 | 6 | 254 | 264 | 1.5050 | .928 |
| 4 | 50 | 45 | 5 | 257 | 265 | 1.5050 | .928 |
| 5 | 54 | 46 | 9 | 259 | 266 | 1.5050 | .928 |
| 6 | 47 | 38 | 9 | 262 | 266 | 1.5035 | .927 |
| 7 | 55 | 43 | 12 | 262 | 267 | 1.5030 | .924 |
| 8 | 58 | 46 | 12 | 263 | 266 | 1.5025 | .926 |
| 9 | 55 | 42 | 13 | 263 | 265 | 1.5025 | .926 |
| 10 | 18 | 13 | 5 | 263 | 264 | 1.5020 | .926 |
| | 130 | 115 | 15 | 271 | 266 | 1.5015 | .924 |

It is to be noted from Table II the fine segregation of nitrogen gases as obtained in each of the ten fractions and indicated by the differences of the refractive indexes.

The hereinabove described process of this invention was also applied to the resolution of a forerun from the distillation of lower boiling aromatic cottonseed meal bases as obtained by the method described in my copending application Serial No. 649,687. From 1 c. c. of a previously caustic dehydrated forerun of cottonseed meal bases, pyridine and 2-methyl pyridine have been successfully isolated and identified by the hereinbefore described process of amplified distillation.

The process of this invention is thus applicable to the resolution of either basic or acidic and some amphoteric substances which may be readily extracted from the carrier. It is also applicable to the separation of isomeric hydrocarbon fractions such as ortho, meta, and para xylenes which by their aromatic nature can be readily separated from the extraneous carrier medium fraction by selective solvents such as liquid sulfur dioxide, nitrobenzol, phenol or other well known solvents which have a higher solubility for aromatic hydrocarbons.

When employing such extraction methods it is desirable to use a paraffinic hydrocarbon as the extraneous carrier medium. This carrier medium may be obtained by first extracting the hydrocarbon with these solvents to remove the aromatics therefrom and to obtain a fraction paraffinic in nature.

Naphthenic acids may be obtained from petroleum fractions by caustic treatment and the acidification of the resulting caustic extract. The naphthenic acids are then separated from the acidified caustic extract sludge and purified by processes involving distillation. Naphthenic acids thus produced are mixtures of compounds having boiling point temperatures which are only slightly separated and for this reason are difficult to separate into their components by ordinary distillation methods. However these complex mixtures of naphthenic acids are readily separated into close cut fractions by employing the process of amplified distillation as described hereinbefore.

For example a narrow cut fraction of naphthenic acids produced as described from a kerosene hydrocarbon fraction and boiling over a range of 480.0–490.0° C. may be fractionally distilled in the presence of a paraffinic hydrocarbon carrier liquid having an approximate boiling point range of 430.0°–540.0° C., and a number of close cut narrow boiling point range fractions of the naphthenic acid-carrier liquid mixture taken. These fractions of the mixture may then each be treated by a selective solvent such as liquid sulphur dioxide to obtain extracted naphthenic acid fractions of extremely narrow boiling point range. When other extraction means is employed such as caustic treatment, the hydrocarbon carrier liquid need not necessarily be paraffinic in nature but may be either paraffinic or aromatic, or it may be of any other character best suited to the type of extraction or other method of separation employed.

Xylene is produced by distillation of coal tar oil which is obtained by the destructive distillation of coal and the absorption of the resulting mixture of gases. Xylene thus produced comprises a mixture of a number of isomers having boiling point temperatures which range from 138.0–142.0° C. and which are difficult to separate by ordinary distillation. These close boiling point isomers may also be readily separated by the process of amplified distillation as described hereinbefore when employing an extraneous paraffinic hydrocarbon liquid carrier having a boiling point range of approximately 75°–190° C. The subsequent recovery of the xylene isomers from the carrier liquid fractions may be accomplished by solvent extraction employing selective solvents, such as liquid sulphur dioxide, having affinities for aromatics.

The process is also applicable to the resolution of paraffinic as well as aromatic substances in which case the carrier medium should be aromatic in character if solvent extraction of the resolved material is desired. Examples of such paraffinic substances are normal and iso pentane, normal and iso butane and normal and iso octane, and other closely boiling mixtures of paraffinic hydrocarbons.

Maximum efficiency in amplified distillation is obviously attained by the use of the maximum quantity of added extraneous carrier, such as a hydrocarbon oil, compatible with the efficient operation of the distillation equipment and method of recovery of the bases from the fractions.

While the specific examples herein disclose the use of fractional distillation, rectification by countercurrent passage against reflux in a tower may also be employed in conjunction with amplified distillation.

It is to be understood that the foregoing is merely illustrative of one method of operation and that the invention is not limited thereby but includes other methods and applies to all other substances of the class described to accomplish the same within the scope of this invention.

I claim:

1. A process for resolving a complex narrow boiling point range mixture of paraffinic compounds into sharply cut fractions comprising adding to said mixture of paraffinic compounds a chemically dissimilar secondary extraneous liquid carrier capable of separation from said paraffinic compounds and having a boiling point range greater than that of said primary substance, distilling the resulting mixture of paraffinic compounds and liquid carrier, separating said mixture into cuts having boiling point ranges narrower than the boiling point range of said paraffinic compound mixture and separating said carrier liquid from said cuts.

2. A process for resolving a complex narrow boiling point range mixture of paraffinic compounds, having a volume insufficient to be fractionated in laboratory micro-fractionating equipment, into fractional components comprising adding to said fractional mixture of paraffinic compounds a relatively large volume of a chemically dissimilar secondary extraneous liquid carrier capable of separation from said paraffinic compounds and having a boiling point range greater than that of the paraffinic compounds to be separated, fractionating the resulting mixture of augmented volume, withdrawing a fraction of said mixture and separating the included portion of the paraffinic compounds from the portion of the said secondary liquid carrier comprising said withdrawn fraction.

3. A process for resolving a complex narrow boiling point range mixture of paraffinic compounds, having a volume insufficient to be fractionated in laboratory micro-fractionating equipment, into fractional components comprising adding to said mixture of paraffinic compounds a relatively large volume of a chemically dissimilar secondary extraneous liquid carrier capable of separation from said paraffinic compounds having a boiling point range greater than and including that of said mixture of paraffinic compounds, fractionating the resulting mixture of augmented volume and boiling point range, withdrawing a fraction of said mixture and separating the included portion of the paraffinic compounds from the portion of the said secondary liquid carrier comprising said withdrawn fractions.

4. A process for resolving a complex narrow boiling point range mixture of paraffinic compounds into sharply cut fractions comprising adding to said mixture of paraffinic compounds a light hydrocarbon liquid carrier having a boiling point range greater than that of said mixture of paraffinic compounds, distilling the resulting liquid body of increasing boiling point range, withdrawing a fraction of said liquid body and extracting the paraffinic compounds from said withdrawn fraction.

5. A process as in claim 4 in which the extraction is performed with a selective solvent.

JAMES R. BAILEY.